Sept. 29, 1953 R. M. GILSON 2,654,024
OPERATING AND SNUBBING CIRCUITS FOR DIRECT CURRENT MOTORS
Filed Feb. 28, 1948 2 Sheets-Sheet 1

INVENTOR.
Robert M. Gilson.
BY
HIS ATTORNEY

Patented Sept. 29, 1953

2,654,024

UNITED STATES PATENT OFFICE 2,654,024

OPERATING AND SNUBBING CIRCUITS FOR DIRECT CURRENT MOTORS

Robert M. Gilson, Pittsburgh, Pa., assignor to Westinghouse Air Brake Company, a corporation of Pennsylvania Application February 28, 1948, Serial No. 11,974

5 Claims. (Cl. 246—242)

1

My invention relates to operating and snubbing circuits for direct current motors and more particularly to operating and snubbing circuits for motors used with railway track switches and the like.

The operation of many devices, such as, for example, railway track switches, is a reversible one and a reversible motor is used as the operating element. In many cases a direct current series motor as the operating unit is preferred. At the end of each movement the motor should be stopped without drift or rebound because such a condition may create a binding in the operating mechanism through which the motor is connected to the device.

Accordingly, a feature of my invention is the provision of novel and improved circuit means for operating and snubbing a direct current series motor.

Another feature of my invention is the provision of improved operating and snubbing circuits for direct current series motors used with railway track switches and the like for the operation thereof.

Other features, objects and advantages of my invention will appear as the specification progresses.

To accomplish the foregoing features, objects and advantages of my invention I provide in one form of apparatus embodying the invention means for reversing the relative connections between the motor field and the motor armature at the instant the power is cut off at the end of a movement. In another form of apparatus embodying the invention, I provide a motor having a special field winding for snubbing purposes. In still another form of apparatus embodying the invention I provide a full wave rectifier to maintain the direction of field excitation for snubbing.

I shall describe four forms of apparatus and circuits embodying my invention and shall then point out the novel features thereof in claims.

Figure 1:
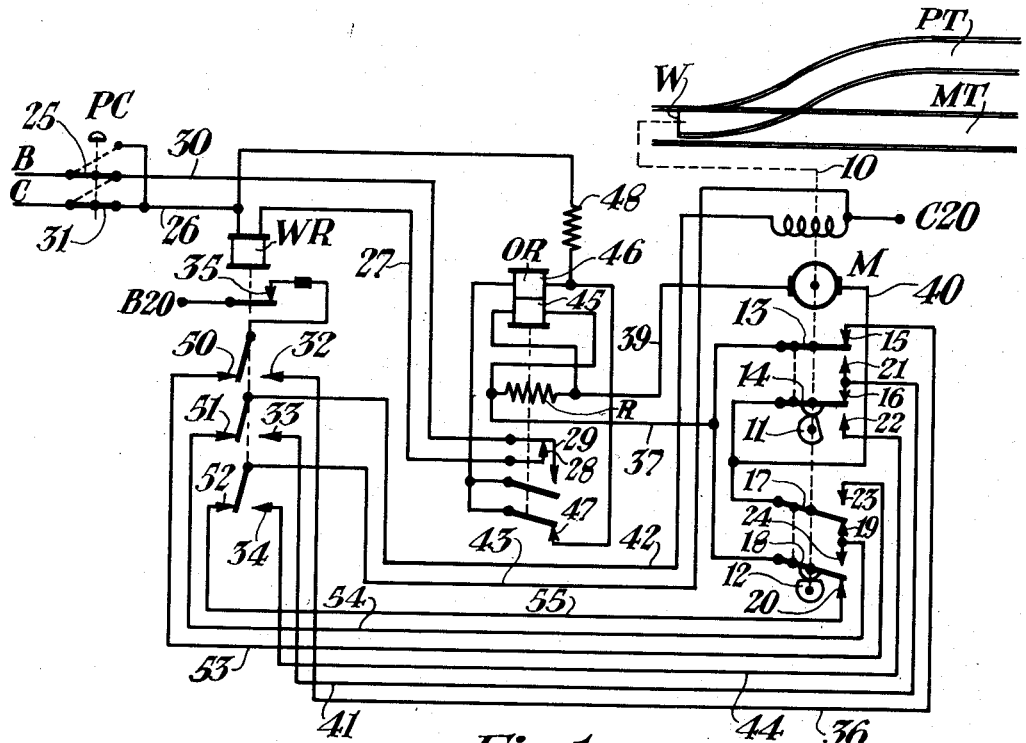
Figure 2:
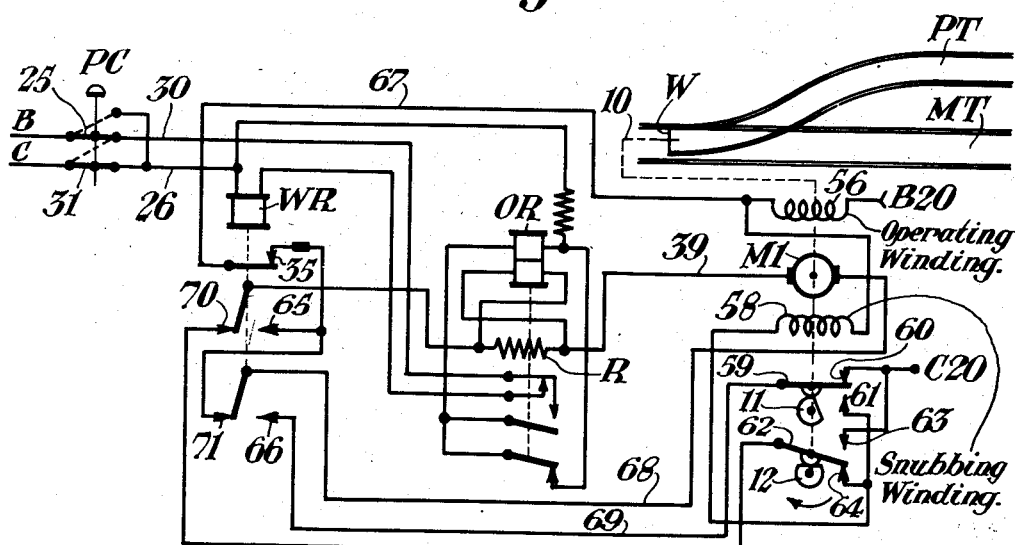
Figure 3:
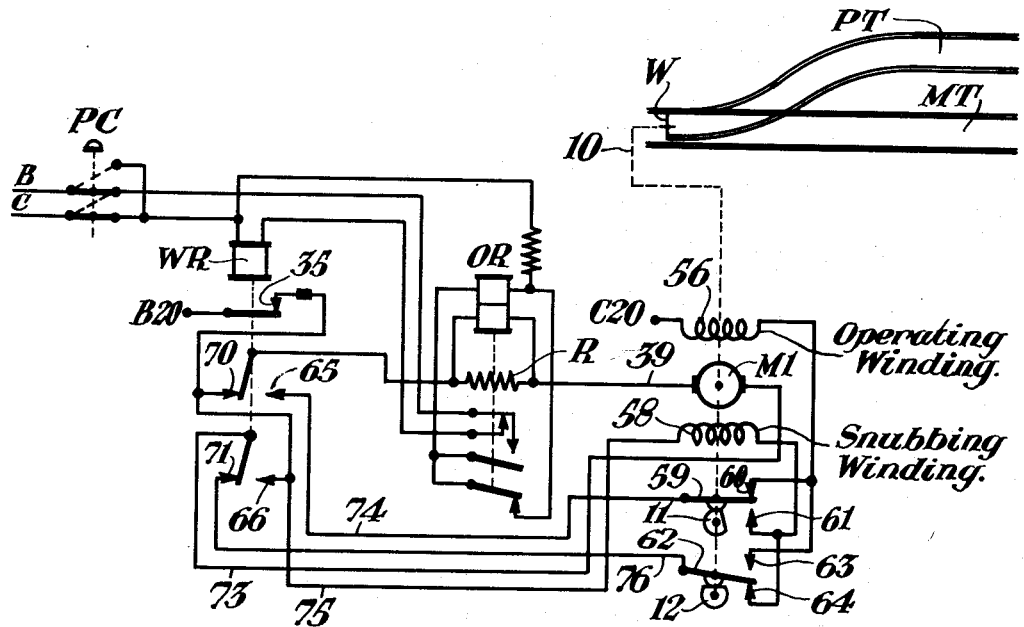
Figure 4:
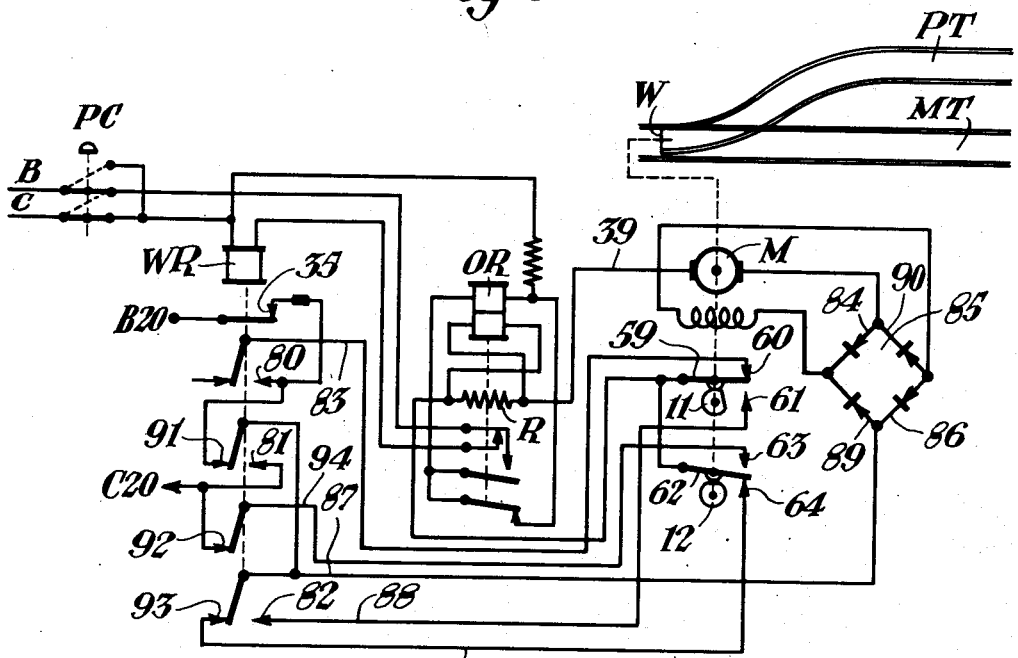

In the accompanying drawings, Fig. 1 is a diagrammatic view showing one form of operating and snubbing circuits embodying my invention when used with a direct current railway track switch operating motor and wherein the relative connections between the motor field and the armature are reversed at the instant the power is cut off at the end of a movement of the track switch. Figs. 2 and 3 are diagrammatic views showing two different forms of apparatus and circuits embodying the invention when used with a railway track switch operating motor having a special snubbing field winding. Fig. 4 is a

2 diagrammatic view showing a form of apparatus embodying the invention when used to operate a railway track switch, and which apparatus incorporates a full wave rectifier for maintaining the direction of field excitation of the motor for snubbing.

It is to be understood that my invention is not limited in its use to a railway track switch motor and this one use serves to illustrate the many places the circuits and apparatus are useful.

In each of the several views like reference characters are used to designate similar parts.

Referring to Fig. 1, the reference character W designates a railway track switch which is operable between two extreme positions, that is, between a normal position where it directs traffic along a main track MT of the railway and a reverse position where it directs traffic from the main track MT to a passing track PT. The switch W is moved to its normal and reverse positions by an electric motor M. The motor M is operatively connected to the track switch through a drive or operating mechanism indicated conventionally by a dotted line 10 since this mechanism can be any one of several well-known structures and its specific construction forms no part of my present invention.

It is sufficient for the present application to point out that this switch operating mechanism 10 includes a train of gears, a mechanical means for connection to the track switch and a controller which is operated to different positions according to the different positions of the device. This controller preferably includes two cam members 11 and 12 which are rotated to different positions according to the different positions of the track switch and which cam members serve as the operating means for contact actuating members. The arrangement is such that the cam members 11 and 12 occupy the positions illustrated in the drawing at the normal position of the track switch, that is, the position shown in Fig. 1 and are rotated clockwise as viewed in Fig. 1 a little less than one complete revolution when the switch is moved to the reverse position. At the normal position a pair of reverse contact members 13 and 14, which are operatively connected together as indicated by a dotted line is in engagement with the circular portion of cam member 11 and the contact members are positioned to close contacts 13—15 and 14—16; and a pair of normal contact members 17 and 18, which are also operatively connected together as indicated by a dotted line, is in engagement with the flat portion of cam member 12 and the contact members are positioned to close contacts 17—19 and 18—20.

When the motor M and the corresponding mechanism is actuated to move the track switch from the normal to the reverse position, the cam members 11 and 12 are rotated as stated above. At the start of this movement of the cam members the curved portion of the cam member 12 comes under the engaging element of contact members 17—18 to raise the contact members out of engagement with the contacts 19 and 20 and into engagement with contacts 23 and 24. At the full reverse position the cam member 11 is rotated to a point where the flat portion of the cam member comes under the engaging element of the contact members 13—14 and these contact members are actuated out of engagement with contacts 15 and 16 and into engagement with contacts 21 and 22.

When the track switch is operated from its reverse position to its normal position then the reverse procedure of the circuit controller is effected. That is, at the very start of the operation the cam member 11 is rotated for its curved portion to come under the engaging element of reverse contact members 13—14 and these members are actuated out of engagement with contacts 21 and 22 and into engagement with contacts 15 and 16. At the full normal position of the track switch the cam member 12 is rotated to bring its flat portion under the engaging element of normal contact members 17—18 and they are actuated out of engagement with the contacts 23 and 24 and into engagement with contacts 19 and 20.

The motor M is controlled by a pole changing controller PC which may be located at some remote point and the control is effected through a polarized switch controlling relay WR and an overload device comprising a relay OR and a resistor R. The relays WR and OR are of the well-known form for such relays.

In describing the operation of the apparatus of Fig. 1, I shall assume that the switch W and its operating mechanism occupy the normal position, that is, the position shown in Fig. 1 and it is desired that the switch be operated to the reverse position. This movement of the switch is initiated by actuating the pole changer lever PC to the dotted line position to complete contacts by which current flows from terminal B of a source of control current, such as a battery not shown, through contact 25, line wire 26, winding of relay WR, wire 27, back contact 28 and continuity transfer contact 29 of overload relay OR, line wire 30 and contact 31 of the controller PC to terminal C of the control current source.

This current energizes the relay WR at a polarity to close its reverse polar contacts 32, 33, and 34, and also a front neutral contact 35. With relay WR moved to its reverse position, a motor operating circuit is completed which can be traced from terminal B20 of a power source not shown, through front contact 35 and reverse contact 32 of relay WR, wire 36, controller contact 13—15, wire 37, resistor R, wire 39, armature of motor M from left to right, wire 40, controller contact 14—16, wire 41, reverse contact 33 of relay WR, wire 42, and field winding of motor M to terminal C20 of the power source. The circuit connections are such that the motor is excited as required to rotate it in a direction to move the switch toward its reverse position. At the start of the movement the cam member 12 is rotated to operate the normal pair of contact members 17—18 to close the contacts 17—23 and 18—24 to prepare a normal switch operating circuit to be described shortly. When the reverse position of the switch W is reached, the cam member 11 moves to operate the corresponding reverse pair of contact members and open the contacts 13—15 and 14—16 and close the contacts 13—21 and 14—22. The opening of contacts 13—15 and 14—16 interrupts the reverse motor operating circuit. This deenergizes the motor but the armature would tend to continue rotation due to its inertia. The closing of contacts 13—21 and 14—22 completes a snubbing circuit for the motor which can be traced from what is the positive or left-hand terminal of the armature of the motor M during this reverse movement through wire 39, resistor R, wire 37, contact 13—21, wire 41, reverse contact 33 of relay WR, wire 42, field winding of the motor, wire 43, reverse polar contact 34 of relay WR, wire 44, contact 14—22, and wire 40 to the right-hand terminal of the armature of motor M. The connection is such that the snubbing circuit tends to maintain the same direction of energization of the motor as that effected by the reverse motor operating circuit and the motor armature is snubbed and its rotation is stopped with substantially no drifting movement.

It is to be observed that the lower winding 45 of the overload relay OR is connected across the resistor R so that this winding 45 and resistor R are in multiple in the motor operating circuit. Also the upper or holding winding 46 of the relay OR is short circuited normally through back contact 47 of the relay and is connected to the control line circuit by a holding or stick circuit that includes a resistor 48 and the front contact of the continuity contact 29 of the relay so that the relay when once picked up by energizing of the lower winding 45 at a preselected energy level, it is retained picked up by current from the control circuit through the holding winding 46. Furthermore, when relay OR is once picked up to open back contact 28 interposed in the connection to relay WR, the relay WR is released to open the motor operating circuit at front contact 35. The arrangement is such that the voltage drop across resistor R which tends to energize the lower winding 45 of relay OR is insufficient to pick up the relay when the motor current is of the usual value necessary to operate the switch W, but in the event the switch W is obstructed and the motor current is larger then the voltage drop across resistor R is sufficient to pick up the relay OR and bring about the interruption of the motor operating circuit. It is also to be observed that the resistor R which is part of the overload protection during the operation of the motor M is also included in the snubbing circuit as a load element.

To operate the switch W back to its normal position the controller PC is moved to its full line position and current flows from the control current source to relay WR through the line circuit previously traced, the connection being reversed and the relay WR being energized at normal polarity to close its normal polar contacts 50, 51, and 52 and the front neutral contact 35.

A normal motor operating circuit can now be traced from terminal B20 of the power source through front contact 35 and normal contact 50 of relay WR, wire 53, controller contact 17—23 closed at the reverse position of the switch, wire 40, the armature of motor M, wire 39, resistor R, wire 37, controller contact 18—24 closed at the reverse position of the switch, wire 54, normal contact 51 of relay WR, wire 42, and the motor field winding to terminal C20 of the power source. This time current flows in the motor armature from the right to the left and the motor is excited in a direction that its armature is rotated as required to move the track switch W to its normal position. As the switch moves away from the reverse position, cam member 11 is rotated counterclockwise to shift reverse contact members 13—14 to close contacts 13—15 and 14—16 to prepare the previously traced reverse motor operating circuit. At the end of the movement of the track switch W to its normal position, the cam member 12 is rotated to the point where the normal contact members 17—18 engage the flat portion of the cam and the contacts 17—23 and 18—24 are opened to interrupt the motor operating circuit and the contacts 17—19 and 18—20 are closed to complete a motor snubbing circuit. This snubbing circuit can be traced from what is now the positive or right-hand terminal of the armature of the motor through wire 40, contact 17—19, wire 54, normal contact 51 of relay WR, wire 42, field winding of the motor, wire 43, normal contact 52 of relay WR, wire 55, controller contact 18—20, wire 37, resistor R and wire 39 to the left-hand terminal of the motor armature. The connection between the armature and the field of the motor being reversed, the direction of energization of the motor maintained by the snubbing circuit is the same as that created during the operation of the motor in moving the track switch to its normal position and the motor is snubbed and stopped with substantially no drifting movement.

It is to be pointed out that the overload relay OR and its associated resistor R function in the same manner during the operation of the switch to the normal position as pointed out in connection with movement of the track switch to its reverse position.

The apparatus of Fig. 2 is the same as in Fig. 1 except the motor M is replaced by a motor M1 having an operating winding 56 and a snubbing winding 58, cam member 11 actuates a single reverse contact member 59, cam member 12 actuates a single normal contact member 62, and the circuits are modified as will shortly appear.

In describing the operation of the apparatus of Fig. 2 I shall assume that the controller PC is operated to its reverse or dotted line position to energize the switch controlling relay WR at reverse polarity to close its reverse polar contacts 65 and 66 as well as its front neutral contact 35. With the relay WR reversed, a reverse motor operating circuit is closed from terminal B20 of the power source through the motor field winding 56, wire 67, front contact 35 and reverse contact 65 of relay WR, resistor R, wire 39, armature of motor M1 from the left to the right as viewed in Fig. 2, wire 68, reverse contact 66 of relay WR, wire 69 and controller contact 59—60 to terminal C20 of the current source. The connections of this reverse motor operating circuit are such that the motor M1 is excited in the direction as required to rotate it for moving the switch to its reverse position. At the start of the movement, the cam member 12 is rotated clockwise to operate contact member 62 to close contact 62—63 to prepare a normal operating circuit to be referred to later. At the end of the movement the cam member 11 shifts contact member 59 to open contact 59—60 and interrupt the motor operating circuit and to close contact 59—61 to complete a snubbing circuit. This snubbing circuit can be traced from the positive or left-hand terminal of the motor armature through wire 39, resistor R, reverse contact 65 and front contact 35 of relay WR, wire 67, snubbing field winding 58 of the motor, controller contact 59—61, wire 69, reverse contact 66 of relay WR and wire 68 to the right-hand terminal of the motor armature. The connection of the snubbing field winding 58 is such that excitation of the motor is maintained in the same direction as that created by the reverse motor operating circuit and the motor is snubbed to avoid any drifting of the motor armature after the operation is completed.

To move the switch W of Fig. 2 back to its normal position, the pole changer PC is set at its normal position so that the relay WR is energized at normal polarity to close its normal polar contacts 70 and 71 and the front neutral contact 35. This completes a normal motor operating circuit and current flows from terminal B20 of the power source through the motor field winding 56, wire 67, front contact 35 and normal contact 71 of relay WR, wire 68, motor armature from right to left, wire 39, resistor R, normal contact 70 of relay WR, wire 72 and controller contact 62—63 closed in the reverse position to terminal C20. This time current flows in the motor armature opposite to that during the reverse movement and the motor M1 is excited as required to move the track switch to its normal position. At the start of this movement, the cam member 11 shifts contact member 59 to close contact 59—60 and prepare the reverse motor operating circuit previously traced. At the end of the movement, the cam member 12 shifts contact member 62 to open contact 62—63 and interrupt the normal operating circuit and to close contact 62—64 to complete a snubbing circuit for the motor. This snubbing circuit can be traced from the positive right-hand terminal of the motor armature through wire 68, normal contact 71 and front contact 35 of relay WR, wire 67, snubbing field winding 58 of the motor, controller contact 62—64, wire 72, normal contact 70 of relay WR, resistor R, and wire 39 to the left-hand terminal of the motor armature. The connection of this snubbing circuit is such that the direction of the field energization of the motor is maintained the same as that created by the normal motor operating circuit and the motor is stopped with substantially no drift.

It is to be observed that in Fig. 2 the overload relay OR and its associated resistor R function in the same manner as described in connection with Fig. 1.

In Fig. 3 the apparatus is the same as in Fig. 2 except for a modification of the motor operating circuits and it is thought that this form of the apparatus can best be understood by a description of its operation.

To reverse the switch W of Fig. 3 the pole changer PC is reversed to bring about reverse energization of relay WR and with relay WR reversed a reverse motor operating circuit is closed for current to flow from terminal B20 of the power source through front contact 35 of reverse contact 66 of relay WR, wire 73, the armature of motor M1 from right to left as viewed in Fig. 3, wire 39, resistor R, reverse contact 65 of relay WR, wire 74, controller contact 59—60 and field winding 56 of the motor to terminal C20.

The motor M1 is now energized in the direction as required to move the track switch to its reverse position. At the start of the movement the cam member 12 shifts the contact member 62 to close contact 62—63 and prepare a normal operating circuit to be described shortly. At the end of the movement the cam member 11 shifts contact member 59 to open contact 59—60 and interrupt the reverse operating circuit and to close contact 59—61 to complete a snubbing circuit and which snubbing circuit extends from the right-hand terminal of the motor armature through wire 73, reverse contact 66 of relay WR, wire 75, snubbing winding 58, contact 59—61, wire 74, reverse contact 65 of relay WR, resistor R and wire 39 to the left-hand terminal of the motor armature. The connections of the snubbing circuit are such that the direction of the motor field energization is maintained in the same direction as that created by the reverse motor operating circuit and the motor is stopped with substantially no drift.

To move the track switch W of Fig. 3 back to its normal position, the pole changer PC is set at its normal position to bring about the normal energization of the relay WR so that its normal polar contacts 70 and 71 and front neutral contact 35 are closed. A normal motor operating circuit now extends from terminal B20 through front contact 35 and normal contact 70 of relay WR, resistor R, wire 39, motor armature from left to right, wire 73, normal contact 71 of relay WR, wire 76, controller contact 62—63, and field winding 56 to terminal C20. This normal motor operating circuit excites the motor in the direction as required to move the switch to its normal position. At the start of this movement the cam member 11 shifts the contact member 59 to close contact 59—60 to prepare the reverse motor operating circuit. At the end of the movement the cam member 12 shifts contact member 62 to open contact 62—63 to interrupt the normal operating circuit and to close contact 62—64 to complete the snubbing circuit which extends from the left-hand terminal of the motor armature through wire 39, resistor R, normal contact 70 of relay WR, wire 75, snubbing winding 58 of the motor, controller contact 62—64, wire 76, normal contact 71 of relay WR, and wire 73 to the right-hand terminal of the motor armature. The snubbing circuit maintains the same direction of field energization of the motor as effected by the normal motor operating circuit and the motor is stopped with substantially no drift.

Again it is to be observed that the overload device including relay OR and resistor R functions in Fig. 3 in the same manner as the device functions for the apparatus of Fig. 1.

In the form of the apparatus shown in Fig. 4, a single winding motor similar to the motor M of Fig. 1, a circuit controller similar to that shown in Fig. 2, and a full wave rectifier 85 are used. It is believed that the apparatus of Fig. 4 can best be understood by a description of its operation.

With the pole changer PC reversed to its dotted line position, control current is supplied to the relay WR to energize the relay at reverse polarity closing its front neutral contact 35 and its reverse polar contacts 80, 81, and 82. Under this condition, a reverse motor operating circuit is completed for current to flow from terminal B20 of the power source through front contact 35 and reverse contact 80 of relay WR, wire 83, controller contact 59—60, resistor R, wire 39, armature of motor M from left to right, one arm 84 of a full wave rectifier 85, field winding of the motor, second arm 86 of the rectifier, wire 87 and reverse contact 81 of relay WR to terminal C20. The current of this reverse operating circuit excites the motor M in the direction as required to move the switch to its reverse position. At the start of the movement the cam member 12 is rotated to lift contact member 62 to close contact 62—63 and prepare a normal motor operating circuit. At the full reverse position of the switch the cam member 11 shifts contact member 59 to open contact 60 and close contact 61. The opening of contact 60 opens the reverse motor operating circuit and the closing of contact 61 completes a snubbing circuit that can be traced from the positive left-hand terminal of the motor armature over wire 39, resistor R, controller contact 59—61, wire 88, reverse contact 82 of relay WR, wire 87, a third arm 89 of the rectifier 85, motor field winding and a fourth arm 90 of the rectifier 85 to the right-hand terminal of the motor armature. This snubbing circuit maintains the same direction of motor field energization effected by the reverse motor operating circuit and the motor is stopped with substantially no drift.

With the switch W at the reverse position and the pole changer PC operated back to its full line position for energizing relay WR at normal polarity so that its front contact 35 and normal polar contacts 91, 92, and 93 are closed, a normal motor operating circuit is completed. Current now flows from terminal B20 of the power source through front contact 35 and normal contact 91 of relay WR, wire 87, arm 89 of rectifier 85, motor field winding, arm 90 of rectifier 85, armature of the motor from right to left, wire 39, resistor R, controller contact 62—63, wire 94, and normal polar contact 92 of relay WR to terminal C20. This time the motor M is energized in a direction necessary to rotate the motor as required to move the switch back to its normal position. At the start of the movement toward the normal position the cam member 11 shifts contact member 59 to close contact 59—60 and prepare the reverse operating circuit. At the full normal position of the switch the cam member 12 shifts contact member 62 to open contact 62—63 and close contact 62—64. The opening of contact 62—63 interrupts the normal motor operating circuit and the closing of the contact 62—64 completes a snubbing circuit which extends from the positive right-hand terminal of the motor armature through arm 84 of the rectifier 85, motor field winding, arm 86 of the rectifier, wire 87, normal contact 93 of relay WR, wire 95, controller contact 62—64, resistor R and wire 39 to the left-hand terminal of the motor armature. This snubbing circuit maintains the field energization of the motor in the same direction effected by the normal motor operating circuit and the motor is stopped with substantially no drift subsequent to the opening of the normal motor operating circuit.

Apparatus here disclosed has the advantages that a direct current series motor used for driving a device in opposite directions between two extreme positions is snubbed at the end of the movement in each direction and thereby avoids binding in the mechanism by which the motor is connected to the device.

Although I have herein shown and described but four forms of operating and snubbing circuits for direct current motors embodying my invention, it is understood that various changes and modifications may be made therein within the scope of the appended claims without departing from the spirit and scope of my invention.

Having thus described my invention, what I claim is:

1. In combination with a series direct current motor operatively connected to a device and provided with a normal and a reverse operating circuit for reversibly moving said device in a normal and a reverse direction, a normal and a reverse snubbing circuit having connections to said motor, said reverse snubbing circuit tending when closed to maintain the energization of the motor effected by said reverse operating circuit, said normal snubbing circuit tending when closed to maintain the energization of the motor effected by said normal operating circuit, a circuit controller operatively connected to said device and including a normal and a reverse contact member each of which is operable to a first and a second position, said reverse contact member having a first position contact interposed in said reverse operating circuit to stop the movement of the device in its reverse direction and a second position contact interposed in said reverse snubbing circuit to close that snubbing circuit, said normal contact member having a first position contact interposed in said normal operating circuit to stop the movement of the device in its normal direction and a second position contact interposed in said normal snubbing circuit to close that snubbing circuit, an overload means including a resistor and a relay winding in multiple, and said overload means interposed in a connection common to said operating circuits and said snubbing circuits to check the magnitude of the current of said operating circuits and to provide a load element for said snubbing circuits.

2. In combination with a series direct current motor operatively connected to a track switch through a drive mechanism and provided with a normal and a reverse operating circuit for moving the track switch to its normal and reverse positions respectively, an overload device including in multiple a resistor and a relay winding, a normal and a reverse snubbing circuit having connections to said motor and adaptable to maintain the direction of the energization of said motor effected by said normal and reverse operating circuits respectively, a circuit controller operatively connected to said drive mechanism and including a normal and a reverse contact means each of which is operable to a first and a second position, said reverse contact means having a first position contact included in said reverse operating circuit to open that circuit at the reverse position of the track switch and a second position contact to close said reverse snubbing circuit subsequent to the opening of the reverse operating circuit, said normal contact means having a first position contact included in said normal operating circuit to open that circuit at the normal position of the track switch and a second position contact to close said normal snubbing circuit subsequent to the opening of the normal operating circuit, and said overload device interposed in a common connection of said operating and snubbing circuits to check the magnitude of the current of the operating circuits and to provide a load for the snubbing circuits.

3. In combination with a device movable between a normal and a reverse extreme position and a series direct current motor operatively connected thereto, a circuit controller operatively connected to said device and including a normal and a reverse contact member, said normal contact member being moved from a first to a second position when said device is moved into its full normal extreme position and said reverse contact member being moved from a first to a second position when said device is moved into its full reverse extreme position, a normal operating circuit including said first position of the normal contact member connected to said motor to energize the motor in a direction to move the device toward its normal extreme position, a normal snubbing circuit including said second position of the normal contact member connected to said motor to maintain the same direction of field energization of the motor created by said normal operating circuit, a reverse operating circuit including said first position of said reverse contact member connected to said motor to energize the motor in a direction to move the device toward its reverse extreme position, a reverse snubbing circuit including said second position of said reverse contact member connected to said motor to maintain the same direction of field energization of the motor created by said reverse operating circuit, and said operating and snubbing circuits having a common connection which includes a resistor to limit the magnitude of the current of the operating circuits and to load the snubbing circuits.

4. In combination with a device movable between a normal and a reverse extreme position and a series direct current motor operatively connected to said device through a drive mechanism for movement thereof, a controller having connection with said drive mechanism for operating contacts according to the position of the device, a normal and a reverse operating circuit including a first and a second contact respectively of said controller connected to said motor to energize the motor as required to move said device toward its normal and reverse extreme positions respectively, said first contact closed at all times except at said normal extreme position of the device, said second contact closed at all times except at said reverse extreme position of the device, a normal and a reverse snubbing circuit including a third and a fourth contact respectively of said controller connected to said motor, said third contact closed only at said normal extreme position of the device and said fourth contact closed only at said reverse extreme position of the device, a relay, a resistor, and said resistor and a winding of said relay in multiple being included in the connection to a terminal of said motor selected for the relay winding and resistor to be included in each of the operating and snubbing circuits, whereby the resistor and relay winding check the magnitude of the current of the operating circuits and are a load for each of the snubbing circuits.

5. In combination with a railway track switch having a reversible direct current motor connected thereto by a drive mechanism for operation to its normal and reverse positions and which mechanism includes a circuit controller operable to different positions according to the different positions of the track switch, operating circuit means including a pole changer connected to said motor for reversible energization thereof, snubbing circuit means connected to said motor for snubbing the motor at the normal and reverse positions of said switch, contacts of said controller included in said operating circuit means to interrupt the operating circuit means at the full normal and reverse positions of the switch, other contacts of said controller included in said snubbing circuit means to close that circuit means only at the full normal and reverse positions of the switch, and a full wave rectifier interposed in the connection of said operating circuit means and snubbing circuit means for maintaining the same direction of field energization of the motor during snubbing as effected during the operation.

ROBERT M. GILSON.

References Cited in the file of this patent

UNITED STATES PATENTS

| Number | Name | Date |
|---|---|---|
| 1,958,360 | Bushnell | May 8, 1934 |
| 2,062,861 | Bushnell | Dec. 1, 1936 |
| 2,156,690 | Hines | May 2, 1939 |
| 2,156,691 | Hines | May 2, 1939 |
| 2,199,952 | Hines et al. | May 7, 1940 |
| 2,495,240 | Brannen | Jan. 24, 1950 |